June 29, 1937.  E. J. DILLMAN  2,085,300
CONTROL DEVICE
Filed July 8, 1932  2 Sheets-Sheet 1
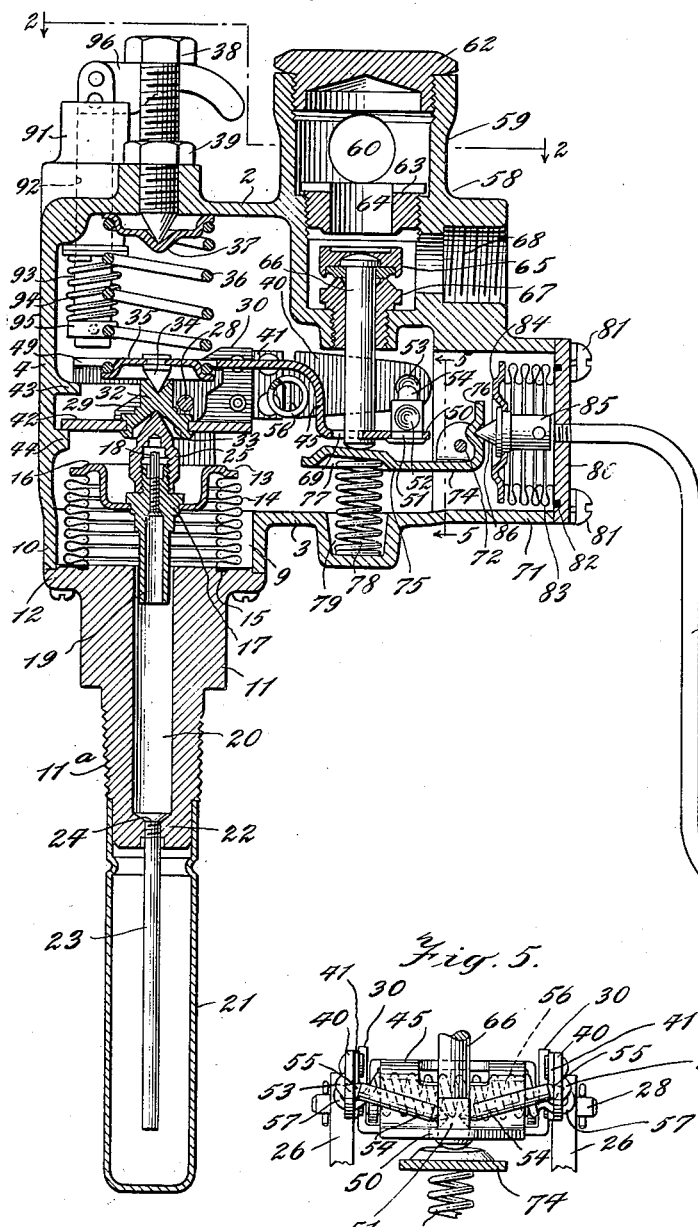
Fig. 1.
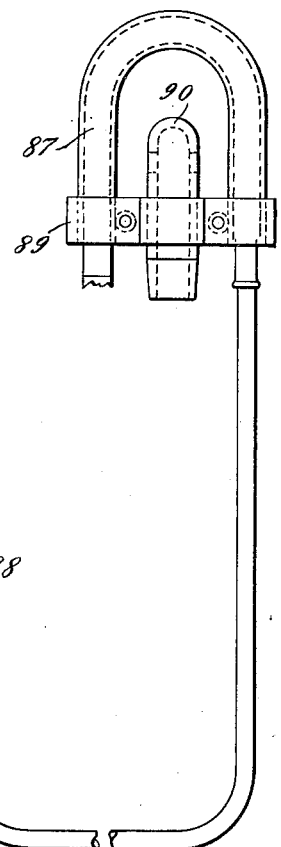
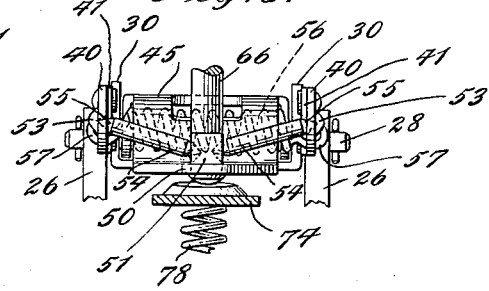
Fig. 5.
INVENTOR
Earnest J. Dillman
BY
his ATTORNEY June 29, 1937.  E. J. DILLMAN  2,085,300
CONTROL DEVICE
Filed July 8, 1932  2 Sheets-Sheet 2
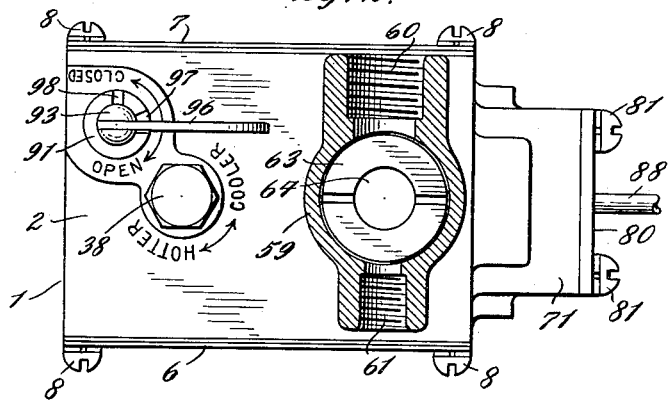
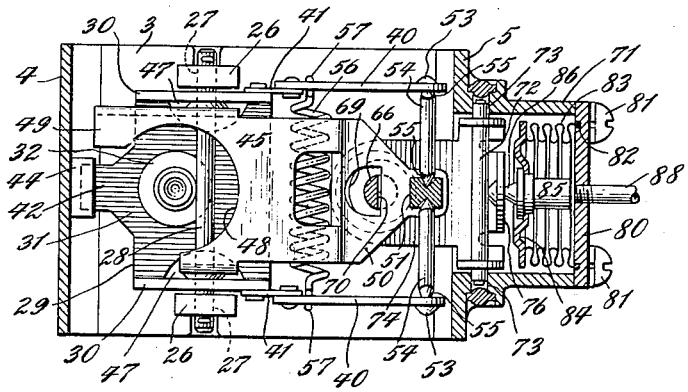
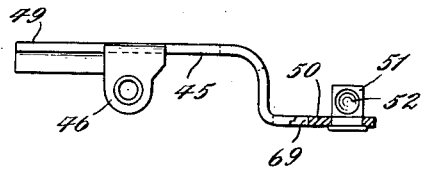
INVENTOR
Earnest J. Dillman
BY
his ATTORNEY Patented June 29, 1937

2,085,300

UNITED STATES PATENT OFFICE 2,085,300

CONTROL DEVICE

Earnest J. Dillman, Detroit, Mich., assignor to Detroit Lubricator Company, Detroit, Mich., a corporation of Michigan Application July 8, 1932, Serial No. 621,383

24 Claims. (Cl. 74—100)

My invention relates to new and useful improvements in control devices, and more particularly to a device for operating a controlling means such as a valve, or the like, which may be employed to control the flow of fuel to a burner.

An object of my invention is to provide a device which is of simple construction, and which will be efficient in operation.

Another object is to provide a device in which the controlling means is operated with a quick or snap action.

Another object is to provide safety means for operating the controlling means.

The invention consists in the improved construction and combination of parts, to be more fully described hereinafter, and the novelty of which will be particularly pointed out and distinctly claimed.

In the accompanying drawings, to be taken as a part of this specification, I have fully and clearly illustrated a preferred embodiment of my invention, in which drawings—

Figure 1 is a view in vertical, central section through a device embodying my invention;

Fig. 2 is a plan view, partly in section, on the line 2—2 of Fig. 1;

Fig. 3 is a view in horizontal section with certain parts removed to show the construction more clearly;

Fig. 4 is a detail view of a lever employed in the device, and

Fig. 5 is a detail view in section on the line 5—5 of Fig. 1.

Referring to the drawings by characters of reference, 1 designates a hollow casing which supports the elements of my device. The casing is preferably substantially rectangular, having top and bottom walls 2, 3 which are joined by end walls 4, 5. The front and rear of the casing may be closed by cover or closure plates 6, 7 secured in position by screws 8. The bottom wall 3 has an aperture 9 therethrough adjacent the end wall 4, and has a depending flange 10 surrounding the aperture. The aperture 9 is closed by a tubular fitting 11 externally threaded, as at 11a, and having a lateral flange 12 which seats against the end of flange 10. The fitting 11 supports a power element or means 13 comprising an expansible-collapsible, substantially cylindrical, circumferentially corrugated element or metal bellows 14 having one end secured and sealed, as by solder, or the like, to the top face of the fitting 11, as at 15. The top end of the bellows 14 is closed by a head or wall 16, such as a plate member, sealed at its periphery to the bellows. The head 16 has a central aperture in which is secured and sealed a tubular filling member 17 which projects from the opposite sides thereof. The bore of member 17 is restricted intermediate its length, and has a filling tube 18 screw-threaded and sealed therein. The inner end 19 of member 17 extends into the bore 20 of the fitting 11 to guide the expansive and contractive movements of the head 16. The lower end of fitting 11 fits within a cylindrical container or bulb 21 to which the fitting is rigidly secured. The bottom end of bore 20 is constricted, as at 22, and receives the upper end of a tube 23, which is screw-threaded and sealed therein, as at 24. The tube 23 depends into the bulb 21 and serves to prevent discharge of gas or vapor from the bulb into the bellows. The container or bulb is charged with a volatile liquid by means of tube 18, after which the tube 18 is closed and sealed and then capped by a hollow plunger or push rod 25, which is internally threaded for screw-threaded engagement with the outer end of member 17.

At the front and rear of the casing, there are fixed bearing blocks 26 which rise from the wall 3 at the opposite sides of aperture 9 and which receive in alined apertures 27 the opposite ends of a shaft or bearing rod 28 which overlies the bellows, but which is offset toward wall 5 from the plunger 25. Journaled or fulcrumed on the shaft 28 is a lever 29 having vertical flanges 30 through which the shaft passes and which are joined by a plate portion 31 which underlies the shaft and extends across or over the plunger 25. The portion 31 has an aperture therethrough in line with the plunger, and rigidly secured in the aperture is a socket member 32 having a substantially conical recess 33 in its underface in which the conical end of the plunger 25 seats. The upper face of member 32 also has a conical recess in which the bearing point or tip 34 on a spring follower member 35 is seated. A helical coil spring 36 seats at its lower end on the member 35 and at its upper end supports an abutment or follower plate 37 engaged by an adjustment screw 38 screw-threaded through the top wall 2 and having a lock nut 39. The screw 38 serves to regulate the resistance of spring 36 to movement of the lever 29 and also determines the force within the bellows which will actuate the lever. The lever 29 has laterally spaced, substantially parallel arms 40 which are supported by the flanges 30 and which are secured to the flanges by hinge members 41 in the form of resilient metal plates, preferably of phosphor bronze, riveted, or otherwise secured, to the arms and flanges, such that the arms 40 constitute flexible portions of the lever 29 extending toward wall 5. The lever 29 has a projection or stop arm 42 extending toward wall 4 and which lies between vertically spaced abutments 43, 44 carried by the wall 4, providing means to limit the movement of the lever about shaft 28. Positioned between the flanges 30 there is a lever 45, also fulcrumed on shaft 28, and having spaced depending ears or flanges 46 which are apertured to receive the shaft. The lever plate portion 31 is apertured or cut away adjacent the flanges 30, as at 47, to provide room for the ears 46. The rear end of the lever 45, toward wall 4 is recessed, as at 48, to provide space for the spring 36, and has an operating arm 49 extending toward the wall 4. The lever 45 has a downward offset portion 50 adjacent its free end and has at its free end an upstanding abutment 51 having oppositely directed, substantially conical recesses or sockets 52 facing outwardly toward the lever portions 40. The free ends of portions 40 are provided with inward facing, substantially conical sockets or recesses 53, said recesses 53 and 52 being located preferably substantially in the same vertical plane extending transversely of lever 45. The levers 29 and 45 are connected by thrust members 54, preferably rods or pins, which terminate at their opposite ends in conical points 55 seating in the pairs of sockets 52, 53. The members 54 are held in position in engagement with the sockets 52, 53 by the resilience of the hinge members 41 and by a tension spring 56 secured at its opposite ends to the lever portions 40 adjacent the members 41 and beneath the lever 45. The spring 56 is preferably of the helical coil type terminating at its ends in hooks 57 engaged in apertures in the portions 40 and said spring being held under tension between the portions 40, so that the portions 40 are under tension but permits them to move outwardly with respect to the main portion of the lever 29.

The lever 45 is operatively connected to a controlling means, which I have shown as a valve having a casing 58, preferably formed integral with casing 1 and supported by walls 2 and 5. On the wall 2 there is a cylindrical extension 59 forming part of the casing 58 and having an inlet port 60 and a pilot supply outlet port 61. The extension is capped and closed by a cover or closure 62, preferably screw-threaded, or otherwise removably secured in place. Within the casing 58 below the ports 60, 61 and substantially in the plane of the top wall 2, there is a partition 63 having a valve port 64 therethrough. A valve 65 within the casing 58 cooperates with the partition 63 to close and control flow through port 64. The valve 65 has a stem or operating plunger 66 which extends downward through a guide sleeve 67 removably secured in an aperture in the wall of casing 58, the valve when in open position seating on the sleeve to prevent leakage around the stem. The outlet from the casing 58 is through a port 68 in the end wall 5. The stem 66 extends downward through an aperture 69 in the lever 45 and has, in the plane of the lever, a transverse slot or kerf 70 into which the edge of the lever extends, so that movement of the lever is imparted to the valve stem.

The end wall 5 has a hollow extension 71 opening into the casing 1 beneath the port 68. A shaft 72 extends horizontally across the interior of the extension and is supported at its opposite ends in apertures 73 in the walls of said extension adjacent the wall 5. Journaled on shaft 72 is a lever 74, preferably of the bell-crank type having a horizontal arm 75 which extends beneath the stem 66, and having an upward directed arm 76. The arm 75 is provided beneath the stem with a downwardly facing recess 77 which receives the upper end of a spring 78, preferably of the helical coil type which is held under compression by engagement with the bottom wall 3, and which seats at its lower end in a socket 79 in the bottom wall. The outer, open end of the extension 71 is closed by a plate member 80 secured thereto by screws 81, or the like. Sealed in an annular groove 82 on the inside face of member 80, is one end of an expansible-collapsible, substantially cylindrical, circumferentially corrugated element or metal bellows 83. The other end of the bellows is closed and sealed by a head or end wall 84 which supports a plunger 85 having a conical end 86 which seats in a conical socket or recess in the bell-crank arm 76. The chamber within the bellows is in communication with a bulb 87 by means of a tube or conduit 88 sealed at one end to the bulb, and having its other end screw-threaded, or otherwise secured and sealed in an aperture through the plate member 80. The bellows chamber and the bulb 87 are charged with a volatile liquid responsive to the heat of a pilot burner flame to expand the bellows 83. The bulb 87 is preferably of inverted U-shape form, having its ends supported in a bracket 89 carried by a pilot burner 90 which is connected by piping, not shown, to the valve outlet 61.

Directly above the operating arm 49, the top wall 2 has an external boss 91, through which and the wall 2 a guide bore 92 extends. An operating member or plunger 93 projects through the bore 92 and is surrounded within the casing by a coil spring 94 held under compression between the top wall 2 and a collar 95 on the free end of the plunger. The plunger 93 is held in raised, inactive position by a stop arm 96 rigid with the outer end of the plunger, and which lies across the top edge of the boss 91. The arm 96 has an extension serving as an operating handle for lifting the arm out of a locking groove 97 by compressing the spring 94, and for turning the plunger to bring the arm into registry with a vertical slot 98 in boss 91, which permits the arm and plunger to move downward under the force of spring 94. On downward movement the plunger engages the operating arm 49 to operate the controlling means, for instance to close the valve 65.

Operation of my device is as follows: The bulb 21 is inserted in the liquid-containing space of a heating apparatus, the temperature of which is to be controlled. The inlet 60 is connected to a source of fluid fuel, such as gas, the outlet 68 is connected to the main burner and the outlet 61 is connected to the pilot burner 90. With the plunger 93 raised and locked in the position shown, and with the heat of burner 90 having expanded the liquid in bulb 87, the valve 65 will be open and the position of the parts will be as shown in Fig. 1 when the temperature surrounding bulb 21 is below the desired value. The force exerted by the spring 36, together with a component of force of spring 56, determines the temperature corresponding to the pressure within the bellows which will act to initiate movement of the lever 29. The inherent force of spring 56 acts equally on the lever arms 40, and due to the inclination of the pins 54 normally acts when the valve is open to move the arms 40 upward. The upward force on arms 40 exerted by spring 56 is a component of its inherent force, which component acts when the valve is open to resist downward movement of the end of lever 29 carrying the arms 40. This component varies with change in the angle at which the pins 54 act on the arms 40 and decreases to zero when the longitudinal axes of the pins are normal to the arms 40. When the lever 29 is moved by the occurrence of the predetermined desired pressure in the bellows, the spring 36 will be compressed, which will increase the resistance of spring 36 to movement of the lever, the increase in the resistance of spring 36 being at a constant rate. As above noted, the component of force of spring 56 resisting movement of lever 29 will decrease to zero in accordance with the decrease in the angle between either pin and the longitudinal axis of spring 56, and this decrease in force will be at a rate greater than the rate of increase of resistance or force of the spring 36, so that the sum of the forces resisting movement of lever 29 will decrease on initial movement of the lever 29. The lever 29 is therefore overcompensated such that there will be no movement of the lever 29 until the force exerted by the pressure means 13 becomes equal to and slightly exceeds the sum of the resistances of springs 36 and 56 when the resistance or opposition to movement of lever 29 by the springs will break down, so that the lever 29 will move quickly from the instant of initial movement to and through dead center position in which the pins 54 are normal to arms 40. As the pins 40 pass overcenter, the direction of action of the component of force of spring 56 will be reversed and act with the pressure means against the resistance of spring 36, so that the lever 29 will move quickly from the instant of initial movement to and through dead center position in which the pins 54 are normal to arms 40. As the pins 40 pass overcenter, the direction of action of the component of force of spring 56 will be reversed and act with the pressure means against the resistance of spring 36, so that the lever 29 completes its movement with a snap action. The temperature at which it is desired to close valve 65 is adjusted by screw 38, which regulates the resistance of spring 36 to the power means 13. When the temperature surrounding bulb 21 reaches the predetermined desired degree for which the valve is set to operate, the pressure exerted by the power means 13 will overcome the combined resistance of springs 36 and 56 and start clockwise movement of lever 29 on its fulcrum 28, which pressure will, without increase thereof, act to move the lever 29 completely and quickly through its range of movement as above described, the lever movement being limited by the stop 43. As the lever arms 40 move downward, the thrust members or pins 54 will approach straight line relation, forcing the arms 40 outward on their hinges 41 transversely to the plane of movement of the lever and against the decreasing component of force of spring 56. When the outer ends of the members 54 move downward beyond straight line position, or overcenter, the force of spring 56 will act through arms 40 and members 54 to force the stem 66 upwards with a snap or quick action to seat the valve 65 on partition 63, thus closing port 64. The lever 45 is free to turn about shaft 28, the force of spring 56 reacting against the spring 36 and finally against the abutment 43 which is engaged by the lever extension 42. With the main burner off, the temperature surrounding bulb 21 will decrease with a resulting contraction of the volatile liquid in the bulb 21 which will relieve the internal pressure on head 16. As the combined force exerted by the power means 13 and the spring 56 which is now acting to hold the valve seated and to oppose spring 36 becomes less than the force of spring 36, the spring will move the lever 29 counterclockwise about shaft 28, facing Fig. 1, which will lift the arms 40. As the outer ends of the thrust members 54 are moved upward, the arms 40 will be flexed laterally outward away from each other on their hinges 41 against the component of force of spring 56 which is acting to retain the valve seated. As soon as the thrust members or pins 54 are moved by initial movement of arms 40, resulting in a decrease in the angle of the pins relative to a line normal to the arms, the component of force of spring 56 opposing spring 36 will decrease, so that the force of spring 36 which is sufficient to overcome the resistance to movement of lever 29 will be sufficient to move the lever completely and quickly through its range of movement. Due to the small angle through which the pins 54 move in reaching a dead center position, the decrease in the component of force of spring 56 is at a greater rate than the rate of decrease in the force of spring 36, due to its expansion on movement of lever 29, so that from the instant of movement of lever 29, the force of spring 36 is sufficient to move the lever completely through its travel. As the pins 54 pass quickly upward at their outer ends through straight line position, in which the outer ends of pins 54 are above the inner ends thereof, the component of force of spring 56 will act equally and oppositely between the levers 29 and 45, serving to aid spring 36 in bringing lever arm 42 against stop 44, and also serving to snap lever 45 in a clockwise direction facing Fig. 1 about shaft 28, which will pull the valve stem 66 quickly downward to open valve 65 with a snap action. The valve is therefore held tightly closed until the temperature is reached at which operation of the valve is to take place and at which initial movement of lever 29 occurs, so that the arms 54 are not permitted to dwell in a position in which the gas pressure will balance the force acting to hold the valve closed, which balanced condition would result in leakage at the valve. The force of spring 56 in moving the valve to open position will react against the power means 13 and finally through extension 42 against the stop 44. The opening of valve 65 permits flow of fuel through port 68 to the main burner (not shown), which will be ignited by the pilot burner 90 to again start the heating of the liquid in the heating apparatus.

As above noted, the lever 29 has no movement until the desired temperature at which the valve 65 is to be moved is reached, and once the lever 29 starts to move, it will have a substantially instantaneous quick movement completely through its range of travel. Due to this operation of lever 29, the valve has a close operating differential, the fall of temperature required to open the valve from the temperature at which the valve is closed being very small, because the lever 29 does not have gradual movement in moving the outer ends of pins 54 to the dead center position. The quick movement of lever 29 which occurs from the instant of its initial movement, provides substantially a double snap action for the valve 65, since the outer ends of pins 54 are carried to and overcenter by a quick, substantially instantaneous movement of lever 29 due to the breakdown of the resistance to the power means on valve closing movement, and to the breakdown of resistance to the force stored in spring 36 on valve opening movement.

Should the pilot burner 90 become extinguished for any reason, the bulb 87 will cool, causing contraction of the volatile liquid in the bulb 87 and bellows 83, which will permit spring 78 to expand as pressure on lever 74 is released. The expansion of spring 78 will force lever 74 upward against the valve stem 66, and if the valve is open, as in Fig. 1, the inner ends of members 54 will be raised, forcing the arms 40 outward against the force of spring 56, which is overcome by spring 78. The outward flexing of arms 40 permits the valve 66 to be seated on partition 63 by spring 78, which will then hold the valve seated to close port 64, irrespective of operation of lever 29. Should the valve 66 be closed when the burner 90 fails, the lever arm 75 will be moved upward against stem 66 by spring 78, which will hold the valve closed, since the force exerted on stem 66 by the spring 56 is less than the force of spring 78 acting to hold the valve closed.

Additional means are also provided for moving the valve to and holding the valve in closed position. By raising the plunger 93 against the force of spring 94 to disengage stop 96 from groove 97, the stop may be turned to aline with slot 98. If the plunger is now released, the stop arm 96 will move into slot 98, permitting spring 94 to force plunger 49 downward onto arm 49 of lever 45, which will rock lever 45 counterclockwise of Fig. 1 about shaft 28. The offset end 50 of lever 45 engages stem 66, and upward movement of end 50 will raise stem 66 to move the valve to closed position. The spring 94 exerts a greater force on stem 66 than does spring 56, and therefore spring 94 will raise the inner ends of thrust members 54, flexing the arms 40 outward against the force of spring 56.

Although I have shown the controlling means as a valve and the power means as operable in response to temperature, it is to be noted that the controlling means may be a switch, or the like, for controlling the flow of electric current, and the power means may respond directly to pressure or to pressure generated by means other than a volatile liquid.

What I claim and desire to secure by Letters Patent of the United States is:

1. A device of the character described, comprising a controlling means, a lever having a fulcrum support, said lever having a flexible arm portion movable transversely to the plane of movement of said lever on said fulcrum, resilient means operatively connecting said arm portion and said controlling means and holding said arm portion under tension, means movable by said lever and acting on movement to transmit the force exerted by said tensioned arm portion to said controlling means, power means operable to move said lever, and yieldable means resisting said power means.

2. A device of the character described, comprising a controlling means, a lever having a fulcrum support and having a resilient arm portion movable transversely to the plane of movement of said lever on said fulcrum, resilient means holding said arm portion under tension, a thrust member movable by said lever and acting on movement to transmit the force exerted by said tensioned arm portion to said controlling means, power means operable to move said lever, and means resisting said power means.

3. A device of the character described, comprising a controlling means, a lever having a fulcrum support and having a flexible arm portion movable transversely to the plane of movement of said lever on said fulcrum, said flexible arm portion being movable with said lever about said fulcrum, resilient means operatively connecting said arm portion and said controlling means and holding said arm portion under tension, a thrust member having pivotal connection with said controlling means and with said flexible arm portion whereby said thrust member acts under the force exerted by said tensioned portion to move said controlling means, power means to move said lever to change the position of said thrust member and thereby the direction of the force exerted by said tensioned portion whereby to move said controlling means, and means resisting operation of said lever by said power means.

4. A device of the character described, comprising a controlling means, a lever having a fulcrum support, said lever having a portion movable transversely to the plane of movement of said lever on said fulcrum, means operatively connecting said controlling means and said portion, a spring acting through said portion and said connecting means upon said controlling means, power means operable to move said lever to change the position of said connecting means whereby the force exerted by said spring will move said controlling means, and means determining the operation of said power means.

5. A device of the character described, comprising a controlling means, a lever having a fulcrum support, said lever having a portion movable transversely to the plane of movement of said lever on said fulcrum, a thrust member movable overcenter and operatively connecting said controlling means and said portion, a spring acting through said portion and said thrust member upon said controlling means, power means operable to move said lever to move said thrust member overcenter and place said spring under stress whereby the force exerted by said spring will move said controlling means, and means determining the operation of said power means.

6. A device of the character described, comprising a controlling means, a lever having a fulcrum support, said lever having a portion movable transversely to the plane of movement of said lever on said fulcrum, a thrust member operatively connecting said controlling means and said portion, a spring engaging said portion and normally acting to maintain said thrust member in operative relation between said controlling means and said portion, said spring acting through said thrust member to actuate said controlling means, power means operable to move said lever to change the position of said thrust member whereby the force exerted by said spring will move said controlling means, and means determining the operation of said power means.

7. A device of the character described, comprising a controlling means, a lever having a fulcrum support and having opposed arms supported for movement transversely to the plane of movement of said lever, said arms also being movable with said lever about said fulcrum, spring means normally urging said arms toward each other, a thrust member positioned between each of said arms and said controlling means, said thrust members being movable overcenter whereby to change the direction of the force exerted by said spring means on said controlling means, power means operable to move said lever to move said thrust members overcenter, and means determining the operation of said power means.

8. A device of the character described, comprising a controlling means, a lever having a fulcrum support and having opposed arms supported for movement transversely to the plane of movement of said lever, said arms also being movable with said lever about said fulcrum, a spring positioned between and connected to said arms and normally urging said arms toward each other, a thrust member positioned between each of said arms and said controlling means, said thrust members being movable overcenter whereby to change the direction of the force exerted by said spring on said controlling means, power means operable to move said lever to move said thrust members overcenter, and means determining the operation of said power means.

9. A device of the character described, comprising a controlling means, a lever having a fulcrum support and having laterally spaced arms supported for movement transversely to the plane of movement of said lever, spring means normally urging said arms toward each other, a second lever operatively connected to said controlling means, a thrust member positioned between each of said arms and said second-named lever, said thrust members being movable overcenter whereby to change the direction of the force exerted by said spring means on said controlling means, power means operable to move said first-named lever to move said thrust members overcenter, means resisting operation of said controlling means by said power means, and means operable on said second-named lever to move said controlling means.

10. A device of the character described, comprising a controlling means, a lever having a fulcrum support and having laterally spaced arms supported for movement transversely to the plane of movement of said lever, a second lever positioned between said arms and overlying said first-named lever, said second-named lever having operative engagement with said controlling means and having an abutment, said abutment having oppositely directed sockets facing said arms, thrust members seated in said sockets and engaging said arms, a spring tensioned between and engaging said arms whereby said spring is operable through said thrust members to move said controlling means, power means operable to move said first-named lever to move said thrust members overcenter whereby said spring will act to move said controlling means, means resisting operation of said controlling means by said power means, and means to move said controlling means upon failure of said power means.

11. A device of the character described, comprising a controlling means, a lever having a fulcrum support and having laterally spaced arms supported for movement transversely to the plane of movement of said lever, a second lever positioned between said arms and overlying said first-named lever, said second-named lever having operative engagement with said controlling means and having an abutment, said abutment having oppositely directed sockets facing said arms, thrust members seated in said sockets and engaging said arms, a spring tensioned between and engaging said arms whereby said spring is operable through said thrust members to move said controlling means, power means operable to move said first-named lever to move said thrust members overcenter whereby said spring will act to move said controlling means, means resisting operation of said controlling means by said power means, and means operable to engage said second-named lever to move said controlling means upon failure of said power means.

12. A device of the character described, comprising a casing, a controlling means supported by said casing, a shaft in said casing, a lever fulcrumed on said shaft and having laterally spaced arms supported for movement transversely to the plane of movement of said lever, a second lever fulcrumed on said shaft and extending between said arms, said second-named lever having operative connection with said controlling means and having an abutment, thrust members positioned between said arms and said abutment, spring means acting through said arms and said thrust members to move said controlling means, power means engaging said first-named lever and operable to move said first-named lever to move said thrust members overcenter whereby said spring means will move said controlling means, a spring engaging said first-named lever and resisting said power means, and means operable to engage said second-named lever to move said controlling means.

13. A device of the character described, comprising a controlling means having a longitudinally reciprocable stem, a lever having a fulcrum support, a thrust member pivotally supported between and operatively connecting said lever and said stem, said thrust member being inclined to said lever and said stem and being movable overcenter, a spring action through said lever and said thrust member to move said controlling means on movement of said thrust member overcenter, power means operable to move said lever to move said thrust member overcenter, means resisting operation of said lever by said power means and exerting an increased resistance on movement of said lever, said spring acting with said resisting means to oppose operation of said lever by said power means, said spring having its resistance decreased on movement of said lever at a greater rate than the rate of increase of resistance of said resisting means whereby the combined resistance of said resisting means and said spring to movement of said lever by said power means decreases upon initial movement of said lever.

14. A device of the character described, comprising a controlling means including a longitudinally reciprocable stem, a lever having a fulcrum support and movable in a plane longitudinally of said stem, a thrust member pivotally supported between and operatively connecting said lever and said stem, said lever having a flexible portion connected to said thrust member and movable transversely to the plane of movement of said lever, a spring acting through said flexible portion and thrust member to move said stem in opposite directions and hold said stem at its opposite limits of movement, power means operable to move said lever to carry said thrust member overcenter whereby said spring is operable to move said stem, said spring having a component of its force resisting movement of said lever by said power means, said component of force decreasing on movement of said thrust member toward dead center position, a spring exerting a predetermined resistance to operation of said lever by said power means, said second-named spring having its resistance increased on movement of said lever but at a less rate than the rate of decrease of resistance of said first-named spring whereby the combined resistance of said first-named and said second-named springs to movement of said lever decreases upon initial movement of said lever by said power means.

15. A device of the character described, comprising a controlling means, a lever having a fulcrum support, a pivotally supported overcenter thrust member actuated upon predetermined movement of said lever, said thrust member having pivotal connection with said controlling means, means stressed against said thrust member by movement of said lever, said stressed means being pivotal with and movable transversely to said lever, said stressed means turning said thrust member on its pivotal connection upon movement of said thrust member overcenter and thereupon acting through said thrust member to operate said controlling means, and means to move said lever.

16. A device of the character described, comprising a controlling means, a lever having a fulcrum support, an arm pivotal with and extending longitudinally of said lever, said arm also being movable transversely to the plane of movement of said lever, overcenter means operatively connecting and for transmitting movement between said arm and said controlling means and being movable overcenter by movement of said arm, said arm being placed under tension against said connecting means upon movement of said arm by said lever whereby the force of said tensioned arm will act upon movement of said connecting means overcenter to actuate said controlling means, and means to move said lever.

17. A device of the character described, comprising a controlling means, a lever having a fulcrum support, a pivotally supported overcenter thrust member actuated upon predetermined movement of said lever, said thrust member having pivotal connection with said controlling means, means stressed against said thrust member by movement of said lever, said stressed means turning said thrust member on its pivotal connection upon movement of said thrust member overcenter and thereupon acting through said thrust member to operate said controlling means, power means to move said lever, and means to move said thrust member irrespective of operation of said lever.

18. A device of the character described, comprising a controlling means, a lever having a fulcrum support, a pivotally supported overcenter thrust member actuated upon predetermined movement of said lever, said thrust member having pivotal connection with said controlling means, means stressed against said thrust member by movement of said lever, said stressed means turning said thrust member on its pivotal connection upon movement of said thrust member overcenter and thereupon acting through said thrust member to operate said controlling means, power means to move said lever, a second lever cooperable with and for actuating said thrust member, a spring acting on said second-named lever and urging said thrust member in one direction, and a second power means cooperable with said second-named lever and operable to overcome said spring.

19. A device of the character described, comprising a controlling means, a pair of pivotally supported spaced resilient arms, spring means normally urging said arms toward each other, a pair of thrust members operatively connecting said controlling means and said resilient arms, said thrust members being movable overcenter whereby to change the direction of the force exerted by said spring on said controlling means, and power means operable to pivot said resilient arms to move said thrust members overcenter.

20. A device of the character described, comprising a controlling means, a lever having a fulcrum support and having two resilient arm portions, a pivotally supported overcenter thrust means actuated upon predetermined movement of said lever, said thrust means having pivotal connection with said controlling means and with said resilient arms, said resilient arms being stressed against said thrust means by movement of said lever to turn said thrust means overcenter and thereupon acting through said thrust means to operate said controlling means, and power means to move said lever.

21. In a control device, a lever, means movable from one position to another, said means when in one position having a component of force opposing movement of said lever in one direction, and a power element acting on said lever to move said lever in said one direction, said power element opposing said means and operable to pivot said lever with a snap action upon overcoming said component of force.

22. In a control device, a lever, means movable from one position to another, said means when in said one position having a component of force directed to oppose movement of said lever in one direction and when in said another position having the direction of the component of force changed to oppose movement of said lever in the opposite direction, and means acting on said lever to move said first-named means in opposite directions and operable upon overcoming said component of force to pivot said lever with a snap action in said one or said another direction.

23. In a control device having a movable controlling means, a snap acting mechanism comprising a lever member, a thrust member operatively connecting said lever member and said controlling means, yieldable means exerting a force acting through said lever member on said thrust member, said thrust member being disposed at an angle to said lever member when the controlling means is in one position so that the component of force exerted by said yieldable means opposes movement of the controlling means to another position, and power means operable to exert a force opposing said component of the force exerted by said yieldable means and move said controlling means to said last-named position, said controlling means being moved to said last-named position with a snap action by said power means upon the overcoming by the power means of said component of the force exerted by said yieldable means.

24. In a control device having a movable controlling means, a pair of movably supported spaced arms, spring means urging said arms toward each other, a pair of thrust members operatively connecting said arms and the controlling means, said thrust members being movable from one position to another, said spring means acting on said controlling means through said arms and said thrust members and having a component of force opposing movement of the controlling means in one direction when said thrust members are in said one position, and a power element opposing said component of force and operable to move the controlling means in said opposite direction with a snap action upon overcoming said component of force.

EARNEST J. DILLMAN.

CERTIFICATE OF CORRECTION.

Patent No. 2,085,300.
June 29, 1937.

EARNEST J. DILLMAN

It is hereby certified that error appears in the printed specification of the above numbered patent requiring correction as follows: Page 2, first column, line 4, after the numeral 4, insert a comma; page 4, first column, lines 49 and 50, claim 1, strike out the words "operatively connecting said arm portion and said controlling means and" and insert the same after "means", line 51, same claim; lines 74 and 75, and second column, line 1, claim 3, strike out "operatively connecting said arm portion and said controlling means and"; page 5, second column, line 27, claim 13, for "action" read acting; and that the said Letters Patent should be read with these corrections therein that the same may conform to the record of the case in the Patent Office.

Signed and sealed this 12th day of October, A. D. 1937.

Henry Van Arsdale.
Acting Commissioner of Patents.

(Seal)